June 25, 1946. W. C. HUEBNER 2,402,750
RELAY CHARACTER-SELECTING SYSTEM FOR PHOTOGRAPHIC COMPOSING APPARATUS
Filed May 3, 1944 8 Sheets-Sheet 3
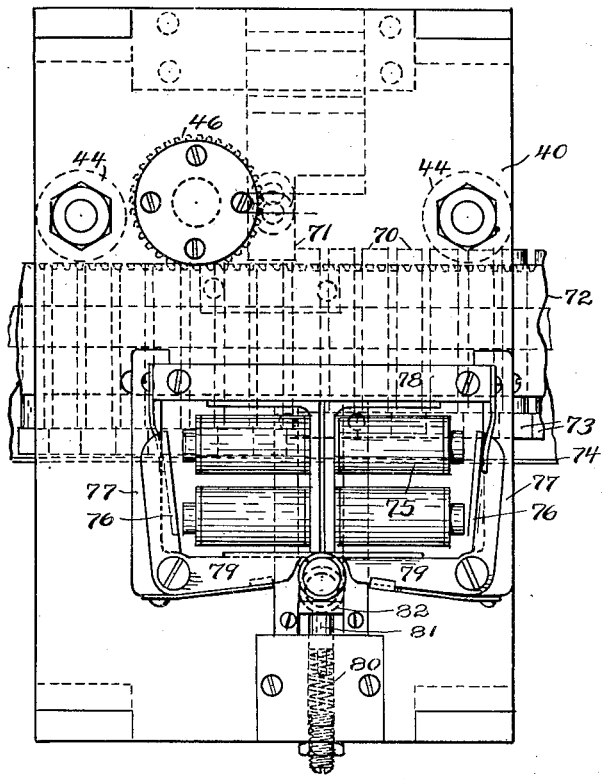
Fig_4_
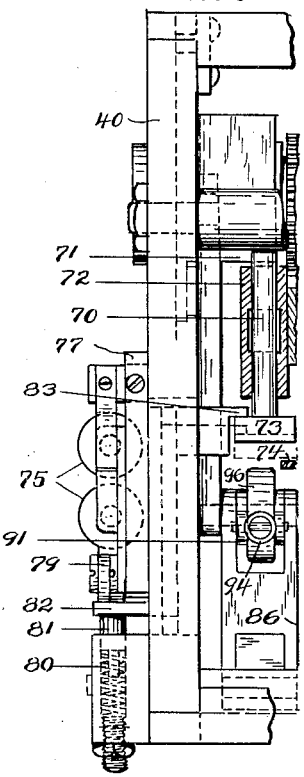
Fig_5_
INVENTOR
*William C. Huebner,*
BY
*Parker & Frohmow Farmer,*
ATTORNEY June 25, 1946.   W. C. HUEBNER   2,402,750
RELAY CHARACTER-SELECTING SYSTEM FOR PHOTOGRAPHIC COMPOSING APPARATUS
Filed May 3, 1944   8 Sheets-Sheet 4
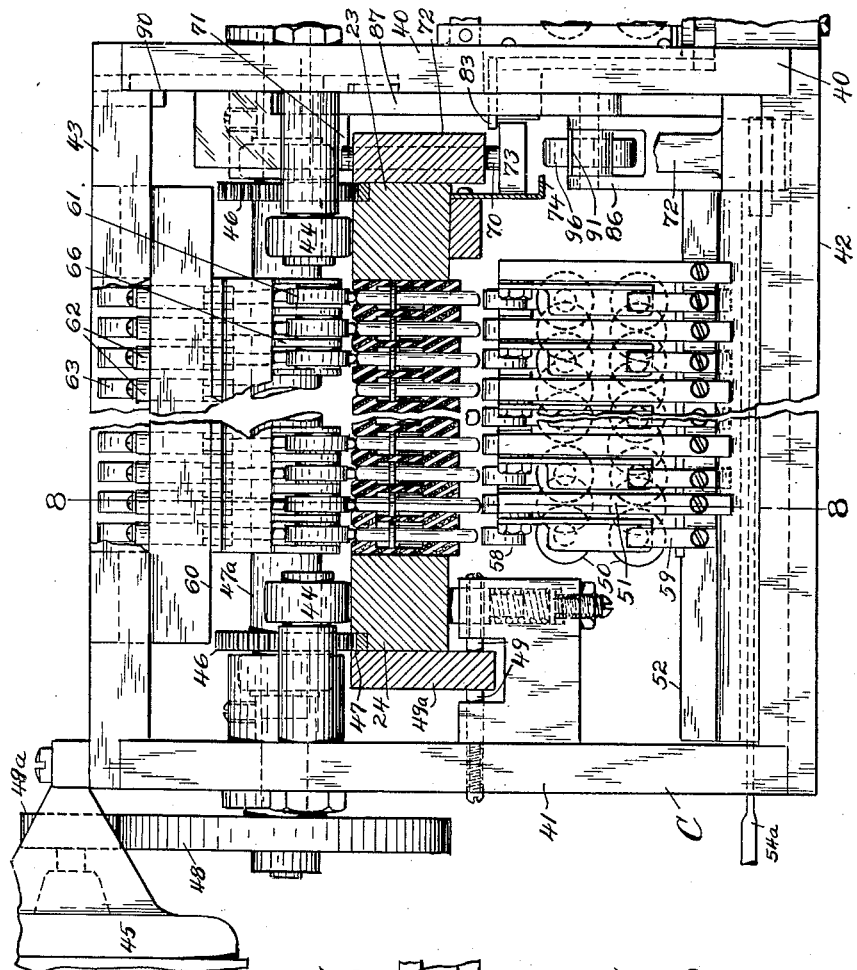
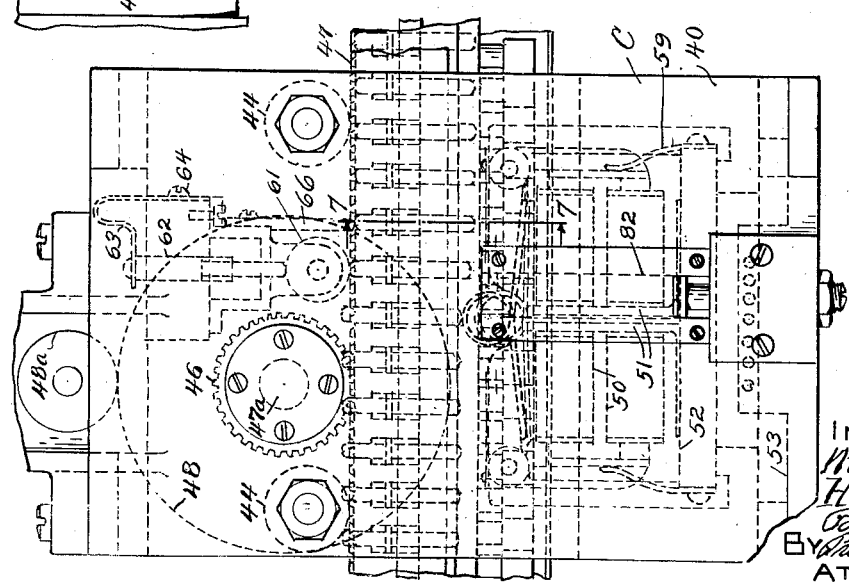
INVENTOR
William C.
Huebner,
BY
ATTORNEY June 25, 1946. W. C. HUEBNER 2,402,750
RELAY CHARACTER-SELECTING SYSTEM FOR PHOTOGRAPHIC COMPOSING APPARATUS
Filed May 3, 1944 8 Sheets-Sheet 5
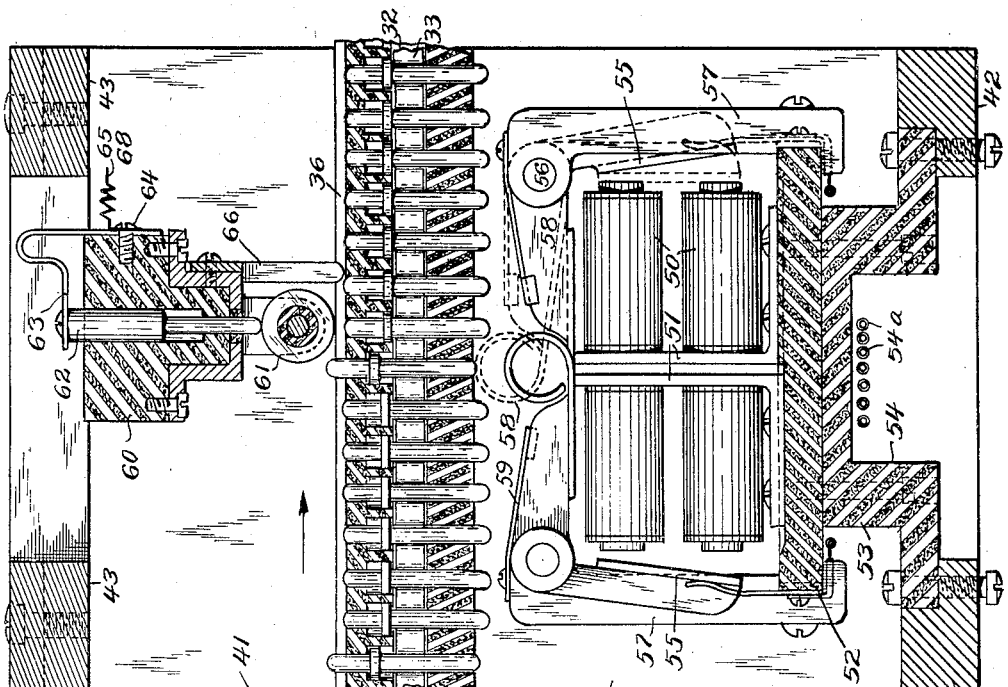
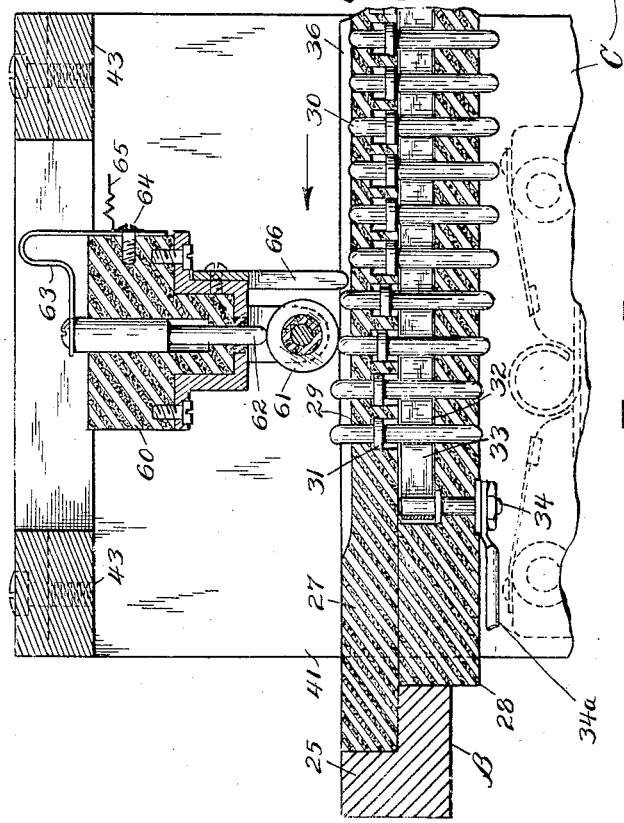
INVENTOR
William C. Huebner,
Parker,
BY Goodnow Farmer
ATTORNEY

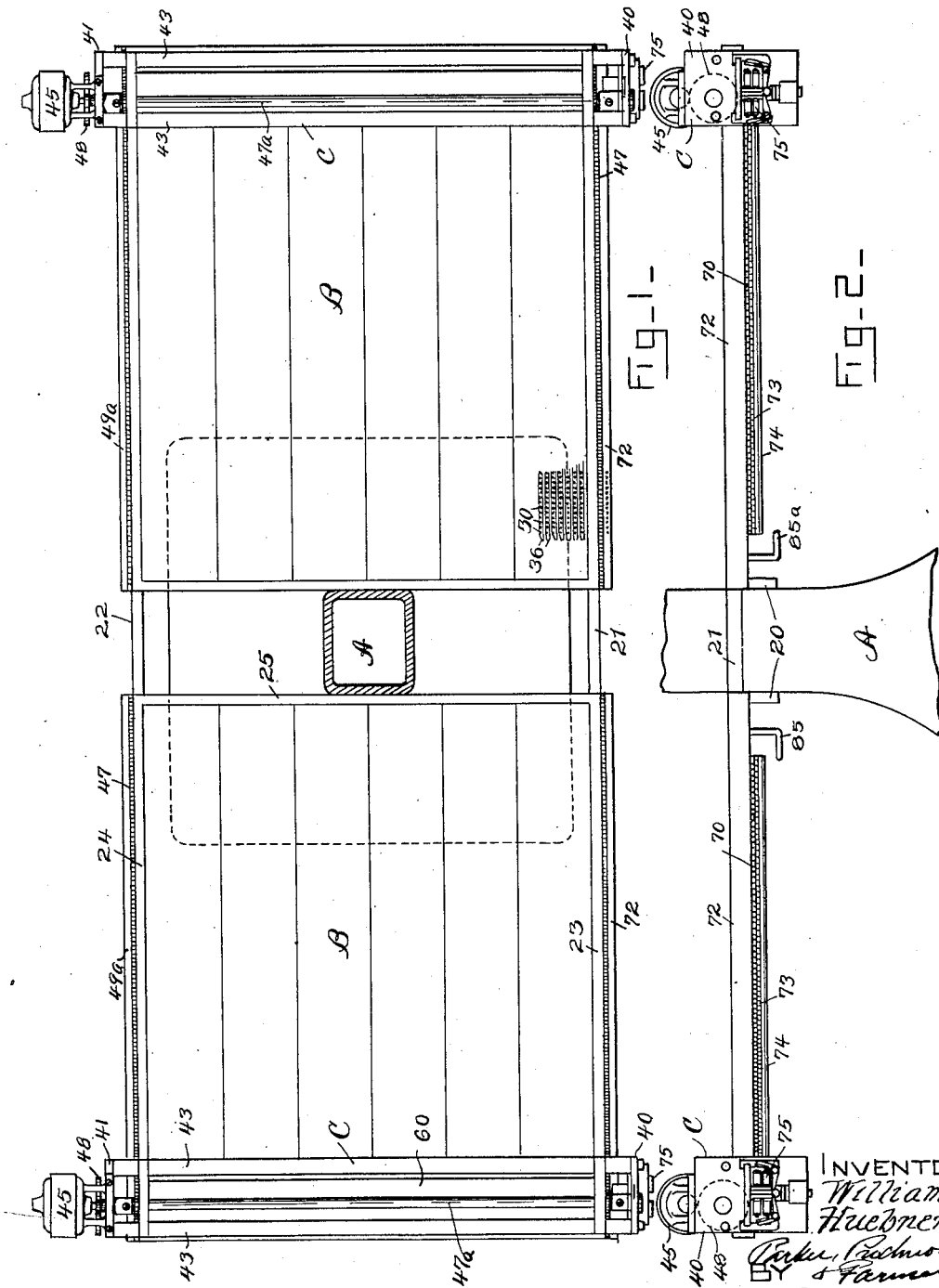

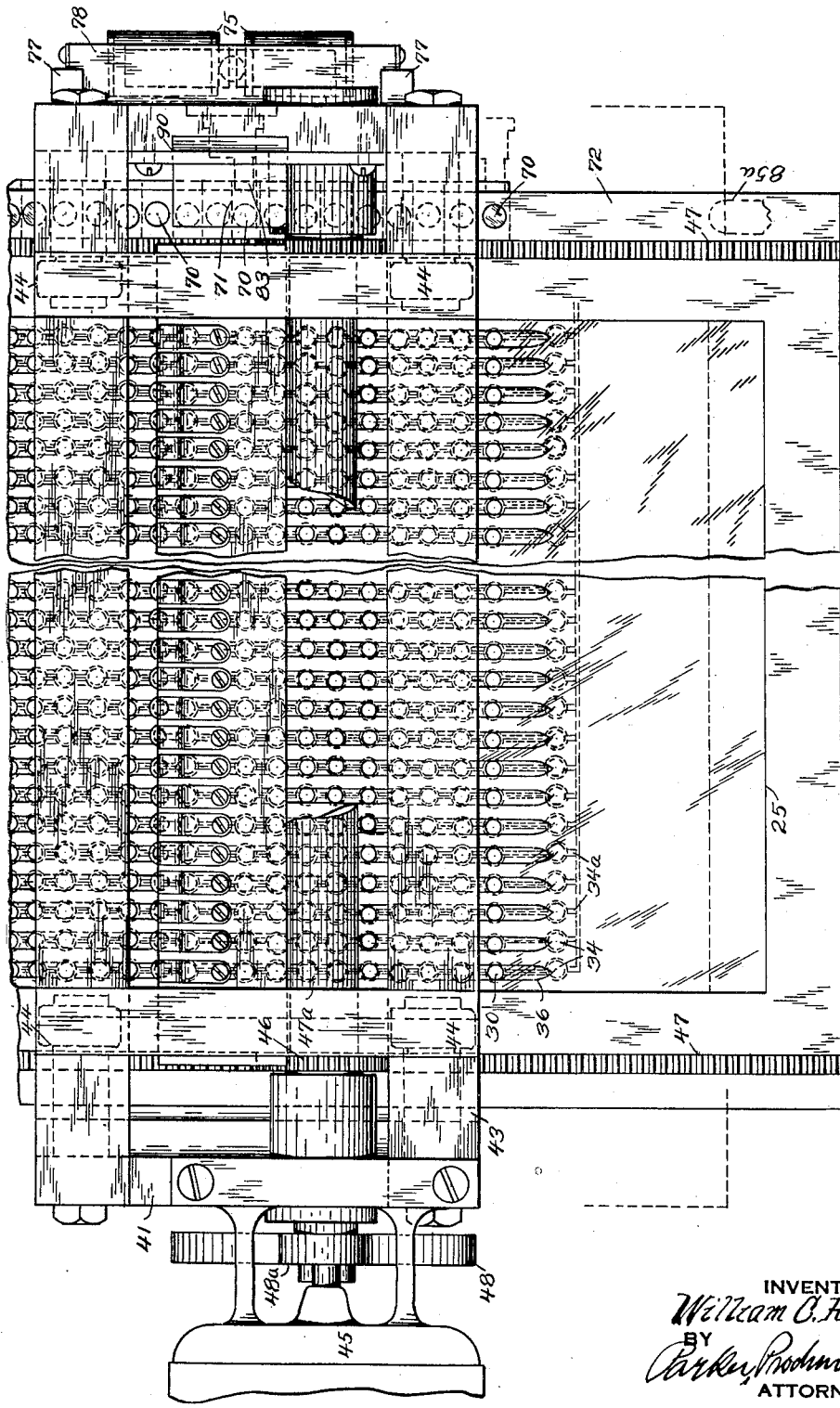

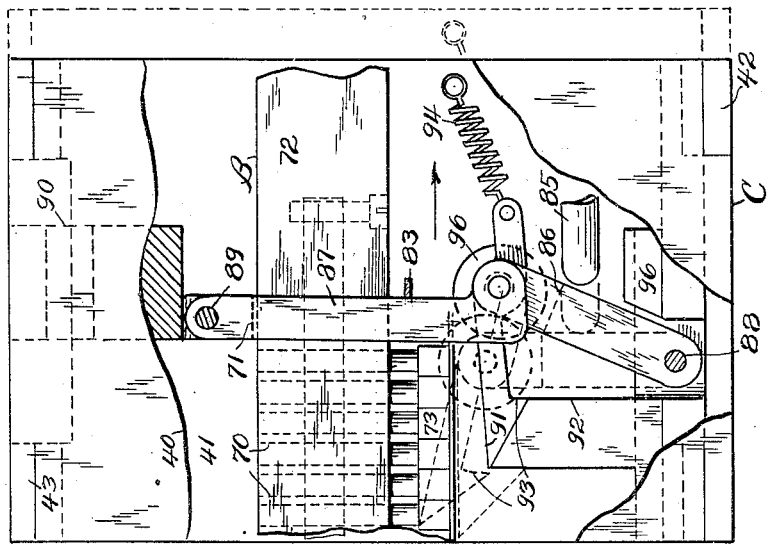
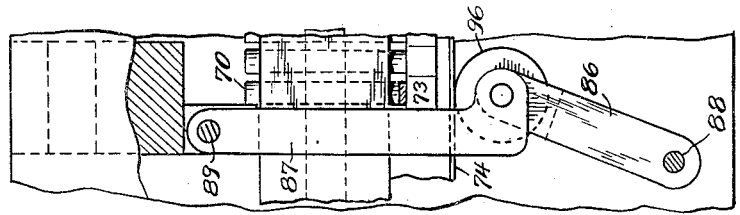
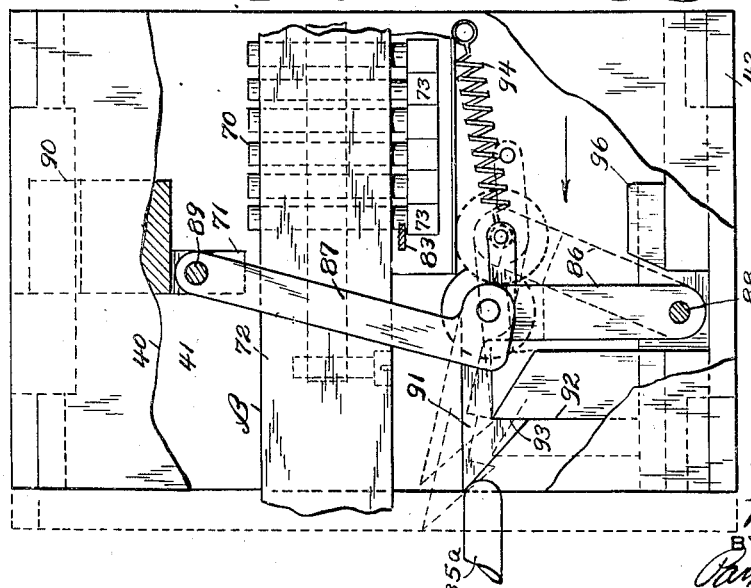

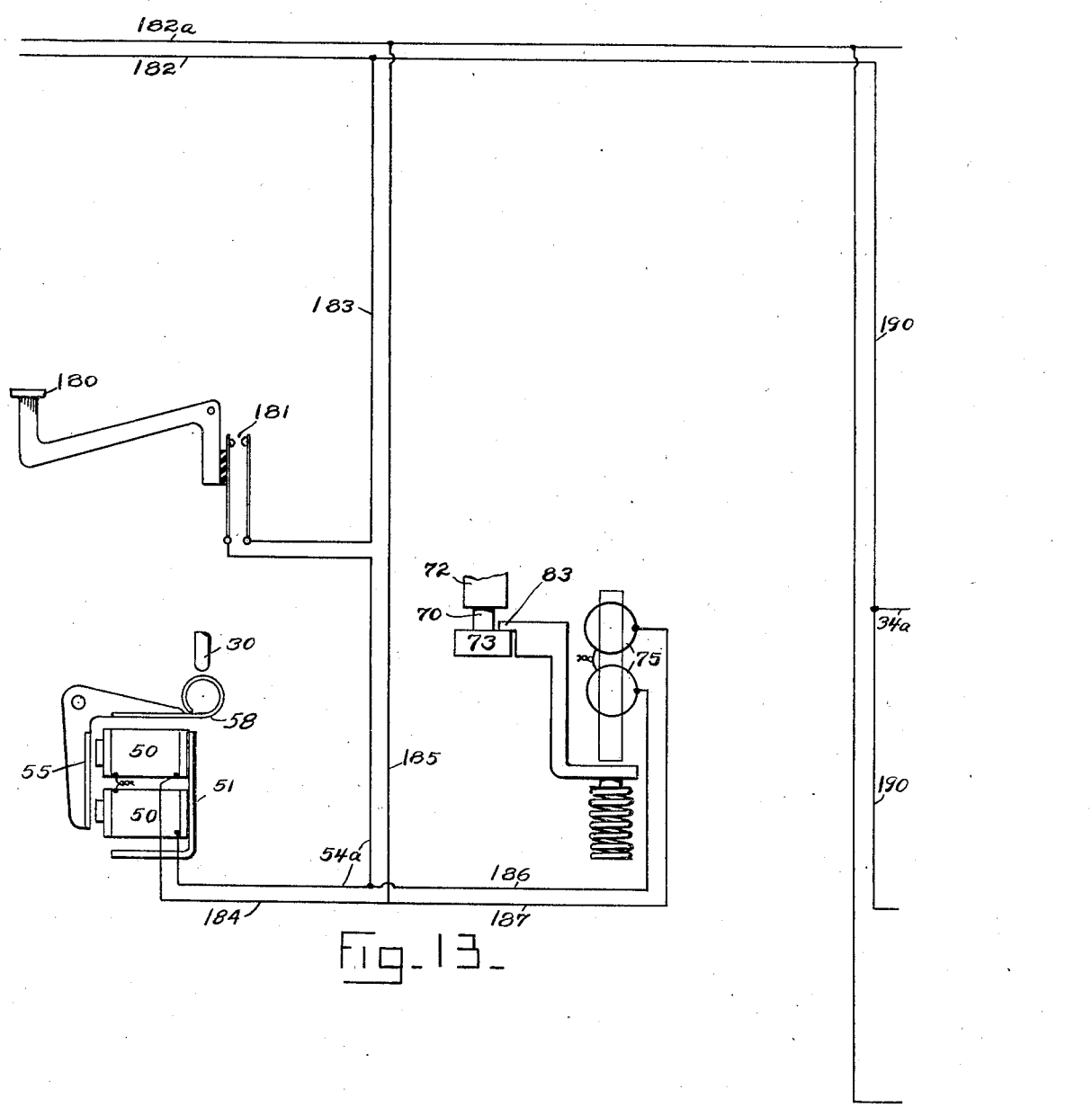
Fig_13_

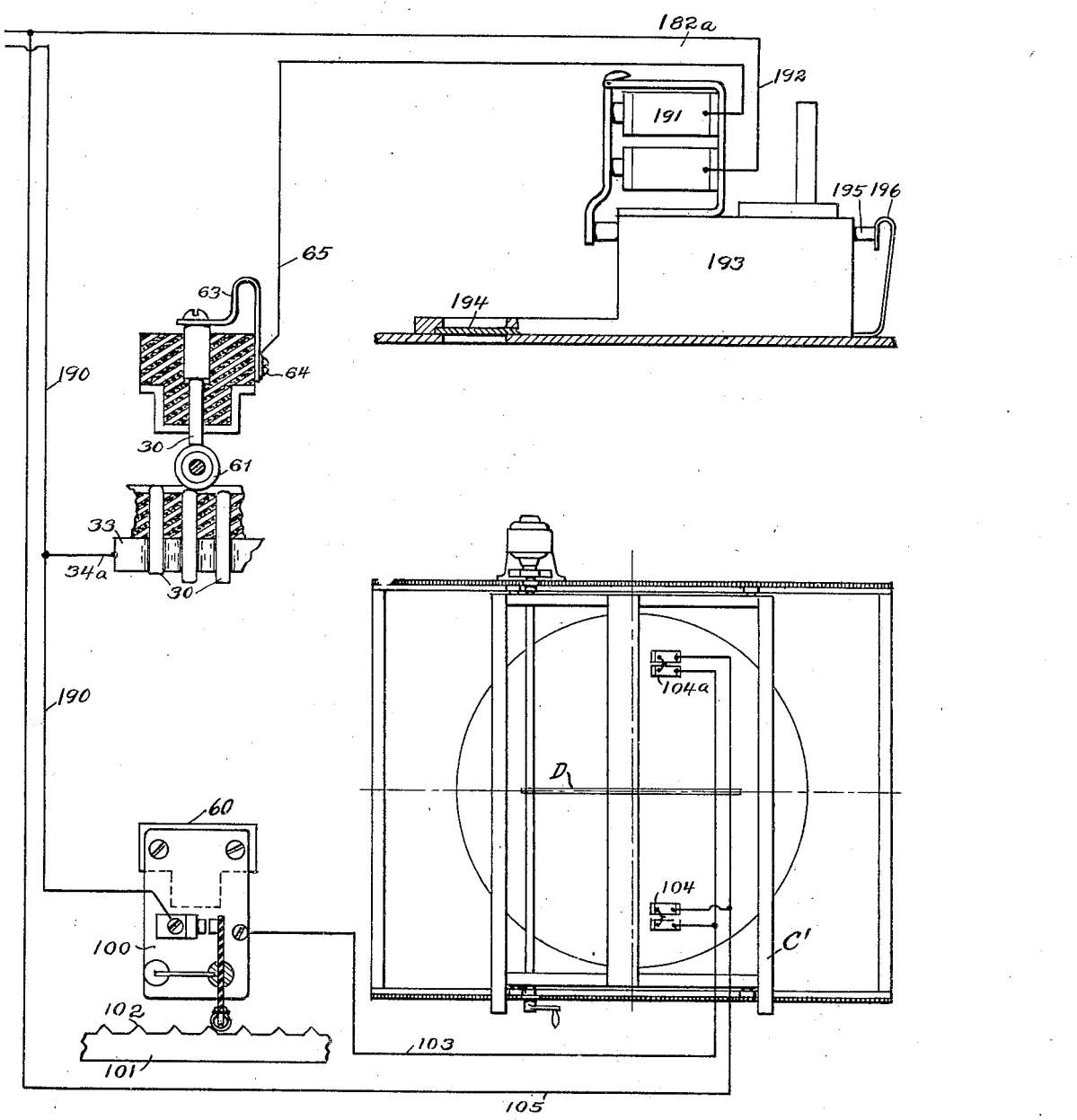
Fig_14

Patented June 25, 1946

2,402,750

UNITED STATES PATENT OFFICE 2,402,750

RELAY CHARACTER-SELECTING SYSTEM FOR PHOTOGRAPHIC COMPOSING APPARATUS

William C. Huebner, New York, N. Y.

Application May 3, 1944, Serial No. 533,920

23 Claims. (Cl. 95—4.5)

This invention relates to a relay selecting system or apparatus for use, for example for selecting or setting characters for printing purposes, and more particularly to a relay selecting system or means for use with photographic composing apparatus of the nature disclosed in U. S. Patent #2,180,417, granted to me Nov. 21, 1939, for Apparatus for photographically composing printing or type characters.

The apparatus disclosed in said patent comprises a font or set of printing or type characters including upper and lower case letters, numerals, punctuation marks and all the various other signs or characters necessary for use in composing printed or reading matter; optical projecting devices for selectively projecting images of the several printing characters of said font for exposure in a required relation on the sensitized or light sensitive surface or coating of a plate, film or other medium; and means for moving said sensitized surface to present successive portions thereof in position to receive the successively projected images of the selected characters so as to thereby photographically compose matter on a surface for use in producing printed or reading matter.

More specifically the present improvements relate to a relay or intermediate character-selecting system or means for use with such a photographic composing or setting apparatus for printing characters, which serves to predetermine or preliminarily select the particular printing characters to be projected to the sensitized surface, prior to the actual projection or recording thereof on the surface, whereby, for example, all of the characters necessary for a full printed line may be selected, or in a sense picked out, before the images of any of the characters are recorded on the sensitized surface, and then after such predetermination or selection, the images of the selected characters are successively recorded in the proper order or relation on the sensitized surface to produce the printing line. Thus, by the use of such relay character-selecting means, if an error is made, as for instance, the selection of the wrong character, the omission or repetition of one or more characters, or the composed line of characters is not of the required length, then the relay-selecting apparatus permits the required corrections in the selection of the characters and the required justification or spacing of the printed line or of the characters before any recording of the characters is made on the sensitized surface. This prevents the recording of errors on the sensitized surface and avoids much delay, labor and expense which would be entailed if the corrections or justification had to be made after the characters have been recorded on the sensitized surface.

One object, therefore, of my invention is to provide a practical and efficient relay-selecting system or means for accomplishing such results.

The general organization and operation of the relay character-selecting system or means of this application may be briefly indicated as follows: A series of movable selector pins or elements is provided for each printing character of the font or set in the composing apparatus. For instance, by way of example, if the font of characters in the composing machine comprises 96 different characters, which number is adequate for all ordinary printing composition work, there will be 96 series or rows of pins or elements, one row for each different character, and each row having therein 96 spaced selector pins or elements. Also the pins or elements are arranged so that they are disposed in parallel rows transverse to the longitudinal rows.

Cooperating with this group of rows of the selector pins or elements is a carriage arranged to travel lengthwise of the rows of the pins and carrying a series of pin setters or actuators, one for each longitudinal row of selector pins, said pin setters being disposed in a transverse row on the carriage. In the initial position of the carriage, each pin setter registers with the first selector pin of a different longitudinal row, and the carriage is advanced step by step, so that in each successive position thereof, the pin setters register with the selector pins in the next successive transverse row. A suitable keyboard is provided having a finger key for each of the several printing characters and a space key. With the carriage in the initial position, the appropriate key for the first character to be selected is depressed or operated and acts through a connected electromagnet or operating device to move the actuator or setter for the registering selector pin which represents that character in the transverse row of pins. The carriage is then advanced one step and places the setters in register with the next transverse row of selector pins. Then, when the key for the next character required is operated, it will similarly set the correlated pin in the second transverse row, this operation being repeated until the selector pins for all of the printing characters necessary to compose a printing line have been actuated or set. This setting of the selector pins does not cause the printing characters to be recorded on the sensitized surface, but after thus setting the selector pins, the travel of the carriage is reversed, and in its return travel past the selector pins, coacts in succession with the several pins which have been set, as through the instrumentality of electrical connections and actuating magnets or devices, to operate the shutters or devices of the photocomposing apparatus which cause the several characters which have been thus selected by the setting pins, to be projected or recorded in succession on the sensitized surface.

In this application, the selector elements are illustrated as and termed "pins," but it is not thereby intended to restrict the invention to the use of pin-like devices for the selector elements, but to comprehend movable elements of other suitable forms.

Another object of the invention is to provide two duplicate groups of selector pins with a selector carriage for each group, whereby the pins of one group can be selected or set, as explained, and during the return travel of the selector carriage of this group for effecting the recording of the characters, the selector pins of the second group can be similarly set to select the characters for the next printing line, so as thereby to enable the operator to operate the keyboard to select the characters for one printing line during the time that the characters for the preceding line are being recorded on the sensitized surface, thereby preventing waste of time and greatly increasing the speed of operation of the composing apparatus.

Further objects and advantages of the invention will appear from the following specification of the preferred embodiment of the invention shown in the accompanying drawings, and the novel features of the invention are set forth in the appended claims.

In said drawings:

Fig. 1 is a plan view of a relay character-selecting means embodying my invention, representing more or less schematically two boards or groups of selecting pins or elements.

Fig. 2 is a front elevation therefor.

Fig. 3 is a fragmentary plan view on a larger scale showing one of the pin boards with the pin selector carriage in an intermediate position over the pin board.

Fig. 4 is a front elevation of the selector carriage and its step by step feed mechanism.

Fig. 5 is a view thereof partly in end elevation and partly in transverse section.

Fig. 6 is a front elevation, similar to Fig. 4, but omitting the parts of the carriage feed mechanism and showing by broken lines the arrangement of the selector pin mechanism which is located back of the feed mechanism.

Fig. 7 is an end elevation thereof, partly in transverse section, on line 7—7, Fig. 6.

Fig. 8 is a fragmentary, longitudinal, sectional elevation on line 8—8, Fig. 7, showing the position of the parts during the return travel of the carriage.

Fig. 9 is a similar view showing the position of the parts during the forward travel of the carriage.

Figs. 10–12 are views partly in front elevation and partly in section, showing different positions of the carriage step-by-step feed mechanism.

Figs. 13 and 14 are diagrammatic illustrations of the electrical control operating means for the relay character-selecting mechanism.

In the preferred embodiment of the invention illustrated in the drawings, A represents the stationary standard or support of a photocomposing apparatus for printing characters. Stationarily mounted on this standard, as by cross supporting bars 20, is a rectangular, horizontal frame comprising longitudinal front and rear bars 21 and 22, connected at their ends by transverse end bars. On this horizontal frame is supported, preferably at opposite sides of the standard A, two horizontal, rectangular pin board frames having front and rear longitudinal frame bars 23 and 24 connected by transverse end bars 25, in which frames are supported two groups of selector pins or elements movably mounted in pin boards or supports B and B'. These boards with their movably supported groups of selector pins are duplicates, so that a detailed description of the left-hand pin board and its associated devices only will suffice for a correct understanding of the dual selecting mechanism. The pin board preferably comprises a plurality (for example six) of parallel panels extending lengthwise of the board, each panel being formed by upper and lower plates 27 and 28 of suitable insulating material secured together. The opposite ends of the upper plate may project beyond the ends of the lower plate for support in rabbeted portions of the end bars 25 of the board-supporting frame, as shown in Fig. 8.

Each board panel is provided with a plurality of parallel, longitudinal rows of holes 29 in which selector pins 30 are movably confined, there being in the whole board one longitudinal row of pins for each different printing character of the font in the composing apparatus. That is, assuming that there are 96 characters in the font, there will be 96 longitudinal rows of pins, or 16 in each panel, and in each longitudinal row there will be 96 equally spaced pins, all correlated with or representing the same printing character. Also, the pins are arranged so that they are alined in parallel rows extending transversely across the pin board. The pins 30 are shiftable vertically in their holes so that in one position they project above the top face of the board and in another position below the bottom face thereof. Preferably the pins are provided between their ends with circumferential collars or enlargements 31 movable in counterbores of the holes 29, so that the upward movement of the pins is limited by engagement of the collars with the upper ends of the counterbores.

For each longitudinal row of pins there is preferably in each lower panel plate a longitudinal channel 32 that intersects the pin holes, which latter may be somewhat counterbored where they intersect the channel, and running lengthwise in this channel at opposite sides of the row of pins are shown contact ribbons 33 which are connected at opposite ends to two terminal posts 34 secured in the bored panel. These ribbons bear against opposite sides of the several pins in the row which deflect or bend the ribbons somewhat into the intersecting counterbores, so that by maintaining the contact ribbons under lengthwise tension, they bear firmly against the opposite sides of the several pins in the row and thus serve to frictionally and releasably hold the pins in either their upper or lower positions. The ribbons are of copper or other conducting material and establish a reliable electrical contact between ribbon and the several pins, so that an electrical conductor 34a connected to one of the terminal posts 34 for the ribbons will be electrically connected with each selector pin in the row. The top faces of the board panels also preferably have longitudinal clearance grooves 35, one in register with each longitudinal row of holes, through which the upper ends of the pins are adapted to protrude. Downward movement of the selector pins may be limited by engagement of their collars with the contact ribbons.

Movable relatively to the pin board, parallel with the longitudinal rows of selector pins is a selector carriage C which carries a transverse row of pin setters or actuators, one for each longitudinal row of pins. As shown, this carriage comprises vertical front and rear end plates 40 and 41 disposed outside of the front and rear edges of the pin board, and bottom and top cross bars 42 and 43 connecting the end plates and extending transversely respectively beneath and above the pin board B and its supporting frame. The carriage is suitably mounted to travel lengthwise of the pin board, as by rollers 44 which may be journalled on fixed studs extending inwardly from the ends of the carriage, and are arranged to roll on the front and rear longitudinal bars 23 and 24 of the pin board frame; and the carriage may be propelled along the pin board, as by an electric motor 45 mounted on the carriage and suitably geared to pinions 46 meshing with toothed racks 47 extending along the longitudinal bars 23 and 24 of the pin board frame. As shown, these rack pinions 46 are secured on a transverse shaft 47a which is suitably journalled in the end plates of the carriage, and at one end is provided with a wheel 48 in frictional engagement with a pinion 48a on the shaft of motor 45. Thus, the carriage may be propelled along the pin board by its motor but is adapted to be arrested at intervals to effect a step-by-step movement thereof, as later explained. Any other suitable slip drive connection for this purpose could be employed, and the carriage can be suitably guided in its travel along the pin board, as for instance, by guide studs 49, Fig. 7, arranged in sliding contact with opposite sides of a guide strip 49a extending along the rear side bar 24 of the carriage-supporting frame.

Mounted on the carriage, and as shown, beneath the pin board is a transverse row or series of actuating motors or devices, preferably electromagnets 50, one for each longitudinal row of the selector pins for actuating or setting them. Each magnet, as shown, has two coils, one above the other, and the magnets are disposed in staggered order in two rows across the carriage, as indicated by solid and broken lines in Fig. 7, to thereby enable a close enough arrangement of the magnets for their armatures or movable members, which constitute pin setters, to be located one beneath each longitudinal row of the selector pins, with a relatively close disposition of the rows of pins. As shown, each magnet is mounted by a bracket 51 on a transverse base plate 52 of suitable insulating material which, in turn, is secured on a transverse sub-base 53, also of suitable insulating material, fixed on the carriage. The sub-base 53 shown, is provided lengthwise of its underside with a channel 54 through which may extend and be housed, electrical conductors or wires 54a, each connected with one of the several magnets 50. The angle-shaped magnet armatures 55 are pivoted at 56 on posts 57 fixed on the base 52 and have arms 58 which extend beneath the several longitudinal rows of selector pins, each arm beneath and in the plane of one longitudinal row of pins, so that when any magnet 50 is energized and its armature actuated, its arm 58 will be raised and will set, or push upwardly so as to project above the top of the pin board, the one selector pin beneath which the end of the arm 58 is located at the time, as indicated by the dotted lines in Fig. 9. Each pin setter 58 may be returned to its normal lowered position when its operating magnet is deenergized by a suitable spring 59, Fig. 9. The carriage C is advanced in one direction (to the right as illustrated) step-by-step, and at successive rest positions between its step movements the transverse row of magnet-actuated pin setters 58 will be located beneath successive transverse rows of the selector pins with each pin setter 58 located below a different selector pin 30 in the same transverse row, so that when any one of the magnets is energized in any rest position of the carriage, one selector pin, but only one, will be raised, or set, but any one of the selector pins in the same transverse row can be actuated by energizing its correlated magnet. Thus, in any rest position of the carriage the selector pin corresponding with or representing any desired printing character can be set, but only one pin representing one character can be set in each step position of the carriage, and similarly in the next rest position of the carriage any one of the selector pins in the next transverse row can be set by energizing its correlated actuating magnet, but only the one pin in said transverse row whose magnet is energized will be set.

Suitably mounted, as on a transverse bar 60 of insulating material, on the carriage C above the pin board is a transverse series of contact elements 61, preferably in the form of rollers, arranged to roll on the pin board each above one longitudinal row of selector pins, so as during the return travel of the carriage C, to contact with any one or more selector pins in said row which has or have been set, as above explained, to project above the board. These rollers are suitably insulated from each other and from their mountings, and movably mounted in holes in said supporting bar 60, are conductor pins 62, each bearing at its lower end on the periphery of one contact roller 61. Each pin 62 is connected at its upper end to a spring conducting strip 63 which is secured, as by a terminal or binding screw 64 to supporting bar 60, and acts to maintain the pin in contact with the roller. During a return travel of the carriage C, when any of the rollers contacts with a selector pin 30 which has been raised or set, it and its conductor pin 62 and spring 63 will establish an electrical connection from the related terminal post 34 and connected conductor 34a through the connected contact ribbon 33 and selector pin to the binding screw 64 and connected conductor 65 for completing a circuit for operating a light shutter or means which projects or records on the sensitized surface in the photocomposing apparatus the character represented by the set selector pin 30, as later explained. Also secured to the supporting bar 60 is a comb 66 having depending teeth, each arranged to trail in a different one of the clearance grooves 36 in the pin board, and during the return travel of the carriage to restore to their retracted positions, the selector pins which were set during the preceding advance of the carriage.

As shown in Fig. 9, in which the carriage C is indicated as movable in the advance direction, the broken line position of the pin setter or arm 58 shows that it sets the pins in a transverse row which is located in rear of the contact rollers 61 and that the selector pins in front of said row are retracted, so that during the step-by-step advance of the carriage, contact rollers 61 will not contact with any of the pins. But, as indicated in Fig. 8, during each return travel of the carriage, the contact roller 61 for each longitudinal row of selector pins is adapted to engage any pins that have been set in said row and the circuit that is thus closed by the roller will remain closed so long as the roller contacts with a pin, and just after the roller clears a pin, the pin will be shoved down through the clearance groove 36 by the comb tooth 66, which trails just behind the roller. In this way the projecting or recording circuits can only be established by those selector pins which have been raised to the set position, and then only during the return travel of the carriage, and the accidental or unintentional closing of any projection or recording circuits is prevented.

Before the commencement of the character selecting operation of the apparatus, the several selector pins are in their depressed position, as shown by the pins at the right-hand portions of Figs. 8 and 9, and the carriage will be in the starting position with the pin setters or arms 58 below the first transverse row of the selector pins. If then the finger key for any printing character illustrated conventionally at 180, Fig. 13, is struck, it will close the operating electric circuit of the corresponding magnet 50, and the setting arm 58 thereof will be raised and will raise the registering selector pin in the first transverse row to its upper position, as shown for instance, by the first pin to the left of the contact roller 61 in Fig. 9. Then, before the key for the next required printing character is struck, the carriage will be advanced one step toward the right, as seen in the drawings, and the pin setting arms 58 will be placed in register with the selector pins 30 in the second transverse row. Now when the key 180 for the next required printing character is struck, its corresponding magnet 50 will be similarly energized and will set the selector pin in the second transverse row that represents that printing character, this operation being repeated each time a key 180 of the operating keyboard is struck. When the keys for all of the characters required for printing a line have been thus operated, the selector carriage will have advanced step-by-step to the right, and one selector pin 30 in each transverse row will have been set in its upper position. The operator then reverses the carriage-propelling motor and the carriage starts its return travel i. e. to the left, as illustrated in the drawings. During this return movement, contact rollers 61 will, as explained, contact one after another, the several selector pins which have been set, and as explained, will establish operating circuits for the projection or recording in succession of the printing characters represented by the several raised or set selector pins, and thus effect the recording of the printing characters on the sensitized surface. During this return travel of the carriage, the comb 66 will sweep over and return to their retracted positions, all of the selector pins which have been set, and when the carriage reaches its initial position, at the left-hand end of the keyboard, the parts will be in position for the next step-by-step advance travel of the carriage and selection of the printing characters for the next printing line.

The mechanism for effecting the step-by-step advance of the selector carriage, as herein illustrated, is constructed as follows, see particularly Figs. 4, 5 and 10–12. A series of spaced retractable stop pins 70 are arranged in a row in the normal path of travel of a cooperating stop member 71 which is mounted on the carriage to shift from an operative, or lower, position in which it is adapted to engage said stop pins, to a raised position in which it can pass over or clear the stop pins, to permit return movement of the carriage. In the initial or rest position of the apparatus, said shiftable stop rests against the first stop pin 70 of the series, as shown in Fig. 11, and holds the carriage from advance movement. The stop pins 70 are movable in guide holes in a bar 72 which extends along the front of the carriage supporting frame, from an upper position in which they can engage the carriage stop 71 to a retracted or lower position in which they clear the carriage stop, and each of the pins, as shown, has a rectangular head or enlargement 73 at its lower end. A stationary ledge 74 extending along under the pins limits their downward movement. Any suitable means, such for example, as the friction means used for the selector pins 30, can be employed to releasably retain the stop pins 70 in their upper or lower positions.

On the front of the carriage is a double electromagnet 75 having armatures 76 suitably pivoted, as on legs 77, depending from a supporting bar 78, preferably of insulating material, stationarily secured on the front of the carriage and on which bar the magnets 75 are suitably mounted. The armatures have lateral legs 79 on which a spring 80 acts through a plunger 81 to normally lift the legs and hold the armatures away from the magnet cores. A trigger 82, arranged to move vertically in a suitable guide on the carriage, has a lateral foot which bears upon and is adapted to be raised by the spring plunger 81, and a finger 83 at its upper end which is adapted to project over the heads 73 of the stop pins 70. The ends of armature legs 79 engage the foot of trigger 82 for pulling the trigger down when the magnet is energized. In the initial position of the carriage, the trigger finger 83 projects over the head 73 of first stop pin at the left of the series, as shown in Figs. 10 and 11. If then the carriage propelling motor 45 is started for advance movement of the carriage and the magnet 75 is energized, its armatures will be attracted and will pull down trigger 82 and thus retract the first pin from engagement with carriage stop 71 to release the carriage. But at this time the forward pressure of the carriage by its motor will hold the trigger finger 83 against the side of the head of the second stop pin and prevent advance of the carriage. When, however, the magnet is deenergized, the spring 80 will lift the trigger to its upper position in which it clears the head of the second stop pin. The carriage will then advance until the carriage stop 71 engages and is arrested by the second stop pin, and in this advance the trigger finger 83 will be moved over the head of the second stop pin in position to retract this pin when the magnet is again energized for the next step advance of the carriage. The carriage is thus advanced step-by-step across the pin board by successive operations of the magnet 75 and retraction of the stop pins in succession until the advance travel of the carriage is arrested by a limit stop.

There are two of these limit stops 85, 85a arranged on the apparatus frame adjacent opposite ends of the pin board for respectively limiting the advance and return travels of the carriage. These stops perform the dual function of limiting the carriage travel and also of causing the carriage stop 71 to be shifted from the operative to the inoperative position and vice versa. Just before the carriage reaches the end of the advance travel, limit stop 85 engages a toggle joint formed by links 86, 87. The inner ends of these toggle links are pivoted together and the link 86 is suitably fulcrumed at its lower end at 88 on the carriage frame, while the upper end of the toggle link 87 is pivoted at 89 to the shiftable carriage stop 71. When the toggle engages the limit stop 85, the toggle is shifted from its bent position, shown in full lines in Fig. 12, to its straightened position, shown by broken lines in the same figure, thereby raising the carriage stop 71, which is movable vertically in a suitable guide 90 on the front of the carriage. This straightening of the toggle joint by the limit stop 85 will cause the bevelled end of a latch 91, which may be pivoted on the knee pin of the toggle, to ride up on the inclined top of a stationary post 92 on the carriage and when the hook 93 of the latch clears the top face of the post, a suitable spring 94 attached to an arm of the latch and to the carriage frame will engage the latch hook with the upper end of the post 92, as shown in Fig. 10, and thereby hold the toggle straight. The toggle being straightened against the post 92, prevents further advance movement of the carriage and holds the carriage stop 71 in its raised position, which is shown in Fig. 10. The spring 94 tends to break or move the toggle joint to the bent position shown in full lines in Fig. 12, when the pawl 91 is released from its post 92 by engagement with the other limit stop 85a, as presently explained.

A roller 95 is shown journalled on the knee pin of the toggle and when the toggle is straightened to lift carriage stop 71 at the end of the advance travel of the carriage, this roller is raised to a position shown by broken lines in Fig. 12, in which it is adapted to roll along against the bottom ends of the stop pin 70 during the return travel of the carriage C, or to the left, as shown in the drawings, thus engaging the stop pins in succession and lifting them to their upper carriage-holding positions. In the return movement of the carriage, the shiftable stop 71 is held up and adapted to pass over the tops of the stop pins. As the carriage approaches the end of its return travel, or its initial position, the bevelled end of the latch 91, which is then held by and projects beyond its keeper post 92, will engage the left-hand limit stop 85a and will be hereby lifted clear of post 92, as illustrated by the broken lines in Fig. 10, and permit the spring 94 to move the toggle to its bent position and thus pull the carriage stop 71 down into its operative position. Toggle link 86, by engaging a suitable abutment 96 on the carriage, limits the bending movement of the toggle and the descent of the carriage stop 71 by the spring 94. Before stop 71 is thus lowered, it will have reached the end of its return travel to the left beyond the row of stop pins 70, and when lowered, will be in position to engage the first stop pin 70, and thus hold the carriage in its initial position.

Operating or control means for the relay character selecting mechanism are shown diagrammatically in Figs. 13 and 14, and are constructed and operated as folows:

180, Fig. 13, represents a finger key, one of which for each printing character is provided in a suitable keyboard. This key, when struck or depressed, closes a switch 181, thereby closing an electrical circuit from one side 182 of a main supply line through a conductor 183, the switch 81, the conductor 54a, the coils of the correlated setting magnet 50 for the selector pins 30, and through conductors 184 and 185 to the other side 182a of the supply line. At the same time the key switch 181 also closes an operating circuit for the magnet 75 that effects the step-by-step movement of the selector carriage, through said conductor 54a, branch conductor 186, coils of magnet 75 and through conductors 187 and 185 to the other side of the supply line. Thus, arm 58 of the magnet 50 is actuated and sets the registering selector pin 30, and after the pin has been set, the magnet 75 causes the carriage to advance one step to place the setter magnets 50 in position to operate the next transverse row of selector pins, as before explained. The carriage is not thus advanced until after the selector pin is set, because, as before mentioned, finger 83 of the retracting trigger for the carriage stop pins 70 engages the head of one stop pin and prevents the advance movement of the carriage until the finger is lifted clear of the head of the stop pin, into position for engaging the next stop pin. In this way the carriage is advanced one stop after the selector pin that represents the printing character corresponding with the finger key which has been struck, is set. The selector pins for all of the printing characters required to compose a line are thus set by striking the keys so representing such characters.

During the return travel of the carriage, which is then caused by reversing its motor, the contact rollers 61 will engage the selector pins 30 which have been set in one transverse row after another, and when each roller engages a selector pin, an operating circuit is established, as from one side 182 of the supply line through a conductor 190, the conductor 34a, contact ribbon 33, the selector pin 30, contact roller 61 and its conducting pin and spring, and conductor 65 to a magnet or electrical device 191 of the photocomposing apparatus, and back through the conductor 92 to the supply line 182a. This electrical device 191 corresponds to the magnet 84 in the photocomposing apparatus of my Patent No. 2,180,417, and operates a shutter or other element of the apparatus, here indicated at 194, which causes the projection of the image of the selected printing character onto the sensitized surface. Magnet 191, as here shown, controls a motor 193 which may be constructed as disclosed in my copending application, Serial No. 537,236, or may be of any other suitable construction. As shown in Fig. 14, magnet 191 actuates a valve 195 of a pneumatic motor 193, to open the shutter 194, and when the magnet is deenergized, its valve 195 is shifted by a spring 196 to close or return the shutter or other projecting device of the photocomposing apparatus to its normal, inactive position. Thus, a shutter or image-projecting device of the photocomposing apparatus is operated to project an image of each selected printing character to the sensitized surface when a contact roller 61 engages the correlated selector pin 30 which has been set, and the shutter or projecting device 194 is held open or active until the contact roller 61 moves out of contact with the selector pin. Therefore the length of time that the shutter remains open, that is, the length of the exposure periods for the character images, can be controlled by regulating or changing the speed of operation of the carriage actuaing motor 45.

Between any successive operations of the shutters or devices 194 for projecting images of the printing characters to the sensitized surface, the carriage for said surface is advanced one step to place the sensitized surface in position to receive the image of the succeeding selected character. This may be accomplished, as shown in Fig. 14, which illustrates the carriage C' for the sensitized surface D of the photocomposing apparatus. A spring actuated or snap switch 100, suitably mounted on the selector carriage, as on the bar 60 thereof, travels past a control bar or element 101 adapted to open and close the switch 100 between each contact of one of the contact rollers 61 with a selector pin 30, and the contact of a roller 61 with a selector pin in the next transverse row of pins, for causing the carriage C' with the sensitized surface to advance one step after the exposure of one image on the sensitized surface, and before the exposure of the next image thereon. When the switch 100 is closed, as by engagement with one of a series of spaced projections 102 on the control element 101, a circuit is completed through conductor 100, said switch 100, conductor 103 to magnets or electrical devices 104 and 104a and through conductor 105 back to the supply line. These magnets 104 and 104a produce the step-by-step movement of the sensitized surface, as by operating the retracting member for the carriage stop pins in my copending application Serial No. 533,921 filed of even date herewith, for justifying means for photocomposing apparatus, the magnets operating as explained in said application, to actuate the stop pins one after another to cause a step-by-step advance movement of the carriage.

As should be apparent from the above, the selector pins 30 are set by the actuation of the keys of the keyboard for selecting or predetermining the characters which are to be recorded on the sensitized surface to compose a printing line. After the pins have been thus set, and during the return travel of the selector carriage, means are operated which cause the projection of the images of the selected printing characters one after another on the sensitized surface, which is shifted or moved after the recording of each image thereon to position for receiving the next image. But the images are not recorded on the sensitized surface until after the selector elements for all of the characters for completing a full printing line have been set, or that is, during the return travel of the selector carriage after the setting of the selector elements. Therefore, if any mistake is made in selecting the printing characters, the mistake can be corrected by retracting the improperly set selector element and setting the proper element before the image of any character is recorded on the sensitized surface. Furthermore, this manner of predetermining or setting of the selector elements for the characters necessary to make up the required printing line enables the justification of the line or the required change in the spacing of the words or characters before the printing or recording thereof on the sensitized surface, as explained in my said application, Serial No. 533,921 for the justification means.

It should be understood that any suitable keyboard comprising keys correlated with the several printing characters of the photocomposing apparatus may be employed, and the keyboard may be of the kind used with Monotype, Linotype or other machines, so as to meet the preferences or demands of those who will use the photocomposing apparatus.

I claim as my invention:

1. In a relay apparatus for selecting printing characters from a font of different characters, the combination of a group of movable selector elements arranged in laterally related rows, each of which rows comprises elements correlated with a different one of said several different printing characters, a series of element-setting devices one for each row of said selector elements, means for producing a relative initial movement between said elements and said setting devices lengthwise of said rows for placing said setting devices in operative register with successive selector elements of said rows, means for selectively operating said setting devices for setting corresponding ones of said elements in character-selecting position, and means acting by a subsequent such relative movement between said elements and setting devices and cooperating with said selected elements subsequently to said setting thereof for selecting the printing character corresponding therewith.

2. In a relay apparatus for selecting printing characters from a font of different characters, the combination of a group of movable selector elements arranged in parallel longitudinal rows each of which rows includes elements corresponding to a different one of the several different printing characters and said elements being arranged in like order in said several longitudinal rows, a series of element-setting devices, one for each longitudinal row of said selector elements movable lengthwise of said longitudinal rows for placing said setting devices during an initial such movement thereof in operative relation to successive elements of the rows, operating keys and connections correlated with said several printing characters for selectively actuating said setting devices for setting corresponding ones of said elements in character-selecting position, and means movable with said setting devices lengthwise of said rows and by such movement cooperating with said selected elements subsequently to said setting thereof for selecting the printing characters which correspond therewith.

3. In a relay apparatus for selecting printing characters from a font of different characters, the combination of a group of movable selector elements arranged in like order in parallel longitudinal rows, each of which rows includes elements corresponding to a different one of said several different printing characters, a series of setting devices for said elements, a carriage on which said setting devices are arranged each in register with one of said rows of elements, means for advancing said carriage in one direction lengthwise of said rows for placing said setting devices in register with successive elements of said rows, a key for each of said several printing characters operatively connected each with a different one of said setting devices for selectively setting corresponding ones of said elements in character-selecting position, and means cooperating with such selected elements for selecting the printing characters corresponding therewith upon a return movement of said carriage.

4. In a relay apparatus for selecting printing characters from a font of different characters, the combination of a group of movable selector elements arranged in like order in parallel longitudinal and transverse rows, each of which longitudinal rows includes elements corresponding to a different one of said several different printing characters, a series of setting devices for said elements, a carriage on which said setting devices are arranged in a transverse row with each device in register with one of said longitudinal rows of elements, means for advancing said carriage step by step in one direction lengthwise of said longitudinal rows for placing said setting devices in register with successive transverse rows of said elements, a key for each of said several printing characters operatively connected each with a different one of said setting devices for selectively setting corresponding ones of said elements in character-selecting position, and means cooperating with such selected elements for selecting the printing characters corresponding therewith upon a return movement of said carriage.

5. In an apparatus for photographically composing printing characters, including a font of printing characters and projecting means for individually projecting images of said characters onto a sensitized surface; a relay selecting means for predetermining the characters of said font whose images are to be projected to the sensitized surface comprising a group of movable selector elements correlated with the several different printing characters of said font, means movable in advance and return directions relatively to said group of selector elements and operable upon an advance movement thereof to selectively set in operative position the selector elements of said group which correspond to the printing characters whose images are to be projected to the sensitized surface, and means movable with said setting means and cooperating with said selected elements upon a return movement of said setting means for effecting operation of said image-projecting means of the printing characters corresponding with said selected elements.

6. In an apparatus for photographically composing printing characters, including a font of printing characters and projecting means for individually projecting images of said characters onto a sensitized surface; a relay selecting means for predetermining the characters of said font whose images are to be projected to the sensitized surface, comprising a plurality of series of movable selector elements, each series including selector elements corresponding to a different one of the several different printing characters of said font, a series of setting devices movable in advance and return directions relatively to said series of selector elements and operable upon an advance movement thereof to selectively set in operative position selector elements which correspond to the printing characters of said font whose images are to be projected to the sensitized surface, and means movable with said setting devices and cooperating with said selected elements upon a return movement of said setting devices for effecting operation of said image-projecting means of the printing characters corresponding with said selected elements.

7. In an apparatus for photographically composing printing characters, including a font of printing characters and projecting means for individually projecting images of said characters onto a sensitized surface; a relay selecting means for predetermining the characters of said font whose images are to be projected to the sensitized surface, comprising a plurality of rows of movable selector elements each of which rows includes elements corresponding to a different one of the several different characters of said font, a series of element-setting devices one for each row of selector elements, means for producing a relative advance movement between said elements and said setting devices lengthwise of said rows for placing said setting devices in operative register with successive selector elements of said rows, an operating key for each of said several printing characters operatively connected each with a different one of said setting devices for selectively setting correlated ones of said elements in character-selecting position, and means movable with said setting devices and cooperating with said selected elements upon a relative return movement between said elements and said setting devices for effecting operation of said image-projecting means of the printing characters corresponding with said selected elements.

8. In an apparatus for photographically composing printing characters, including a font of printing characters and projecting means for individually projecting images of said characters onto a sensitized surface; a relay selecting means for predetermining the characters of said font whose images are to be projected to the sensitized surface, comprising a plurality of rows of movable selector elements each of which rows includes elements corresponding to a different one of the several different characters of said font, a series of element-setting devices one for each row of selector elements, a carriage on which said setting devices are arranged in a transverse row with each device correlated with one of said rows of elements, means for advancing said carriage in one direction lengthwise of said rows for placing said setting devices in register with successive selector elements of said rows, an operating key for each of said several printing characters operatively connected each with a different one of said setting devices for selectively setting correlated ones of said elements in operative position, and means cooperating during a return movement of said carriage with said selected elements which have been set, for effecting operation of said image-projecting means of the printing characters corresponding with said selected elements.

9. In an apparatus for photographically composing printing characters including a font of printing characters, and electrically operated projecting devices for individually projecting images of said characters onto a sensitized surface; relay selecting means for predetermining the characters of said font whose images are to be projected to the sensitized surface, comprising a plurality of series of movable selector elements, each series including selector elements corresponding to a different one of the several different printing characters, a series of electrical devices, one for each series of said selector elements, for setting said elements in operative position, means for advancing said setting devices into operative relation to successive selector elements of said series, an operating key for each of said several printing characters, and electrical connections from each key to a different setting device for selectively setting in operative position selector elements of said group which correspond to the printing characters whose images are to be projected to the sensitized surface, and means movable with said setting devices and cooperating with said selected elements by a return movement of said setting devices for establishing control electrical circuits for said image-projecting devices of the printing characters corresponding with said selected elements.

10. In a relay apparatus for selecting printing characters from a font of different characters, the combination of a group of movable selector elements arranged in laterally related rows each of which rows includes elements corresponding to a different one of said several different printing characters, a series of setting devices for said elements one for each row of elements, means for producing a relative movement between said elements and said setting devices lengthwise of said rows for placing said devices in operative register with successive selector elements of said rows, an operating key for each of said several printing characters each having electrical operating connections with a different one of said setting devices for selectively setting corresponding ones of said selector elements in operative position, and means cooperating with said selected elements subsequently to said setting thereof, for establishing electrical circuits for selecting the printing characters corresponding with said selected elements which were set.

11. In a relay apparatus for selecting printing characters from a font of different characters, the combination of a group of movable selector elements arranged in like order in longitudinal rows, each of which rows includes elements corresponding to a different one of the several different printing characters, a series of electrical setting devices for said elements, a carriage on which said setting devices are arranged in a transverse row with each device in register with a different longitudinal row of elements, means for advancing said carriage in one direction lengthwise of said rows for placing said setting devices in operative register with successive elements of said rows, an operating key for each of said several printing characters electrically connected each with a different one of said setting devices for selectively setting corresponding ones of said elements in operative position, and a series of contact devices on said carriage arranged to contact with said selected elements upon a return travel of said carriage to establish electric circuits for selecting the printing characters corresponding with said selected elements.

12. In a relay apparatus for selecting printing characters from a font of different characters, the combination of a group of movable selector elements arranged in like order in longitudinal rows, each of which rows includes elements corresponding to a different one of the several different printing characters, a series of electrical setting devices for said elements, a carriage on which said setting devices are arranged in a transverse row with each device in register with a different longitudinal row of elements, means for advancing said carriage in one direction lengthwise of said rows for placing said setting devices in operative register with successive elements of said rows, an operating key for each of said several printing characters electrically connected each with a different one of said setting devices for selectively setting corresponding ones of said elements in operative position, a series of contact devices on said carriage arranged to contact with said selected elements upon a return travel of said carriage to establish electric circuits for selecting the printing characters corresponding with said selected elements, and means operating during the return travel of said carriage to retract from operative position said selected elements which were set in operative position.

13. In a relay apparatus for selecting printing characters from a font of different characters, the combination of a group of movable selector elements arranged in like order in longitudinal rows, each of which rows includes elements corresponding to a different one of the several different printing characters, a series of electrical setting devices for said elements, a carriage on which said setting devices are arranged in a transverse row with each device in register with a different longitudinal row of elements, means for advancing said carriage step by step in one direction lengthwise of said rows for placing said setting devices in register with successive elements of said rows, a key for each of said several printing characters electrically connected each with a different one of said setting devices for selectively setting corresponding ones of said elements in operative position, electrical means controlled by said key for advancing said carriage one step after each selected element is set in operative position, and a series of contact devices on said carriage arranged to contact with said selected elements upon a return movement of said carriage to establish electric circuits for selecting the printing characters corresponding with said selected elements.

14. In a relay apparatus for selecting printing characters according to claim 4, in which said means for advancing the carriage step by step comprises a longitudinal row of stop elements, a shiftable stop on said carriage engageable in one position thereof with said stop elements in succession, means for retracting said stop elements in succession to effect step advance movements of said carriage, and means acting upon the return travel of said carriage to return said stop elements to operative stopping position and shift said carriage stop to clear said stop elements during the return travel of said carriage.

15. In a relay apparatus for selecting printing characters according to claim 4, in which said means for advancing the carriage step by step comprises a longitudinal row of stop elements, a shiftable stop on said carriage engageable in one position thereof with said stop elements in succession, means for retracting said stop elements in succession to effect step advance movements of said carriage, a toggle for shifting said carriage stop, a limit stop which engages said toggle and shifts said carriage stop to an inoperative position to clear said stop elements during the return movement of the carriage, an element carried by said toggle which engages said stop elements to return them to operative position during the return travel of the carriage, and a limit stop which engages and operates said toggle at the end of the return movement of the carriage to return said carriage stop to its operative position.

16. In a relay apparatus for selecting printing characters from a font of different characters, the combination of a group of movable selector elements arranged in like order in parallel longitudinal rows, each of which rows includes elements corresponding to a different one of said several different printing characters, a series of setting devices for said elements, a carriage for said setting devices, and means for advancing said carriage step by step to place said setting device in operative relation to successive elements of said rows, comprising a motor having a slip drive connection with the carriage, a stop on the carriage, a series of stop elements arranged to be engaged in succession by said carriage stop to hold the carriage against movement by said motor, means for retracting said stop elements in succession to effect step advance movements of the carriage, and means acting upon return travel of the carriage to return said stop elements to position for engagement by said carriage stop in the next advance travel thereof.

17. In an apparatus for photographically composing printing characters, including a font of printing characters and projecting means for individually projecting images of said characters onto a sensitized surface; a relay selecting means for predetermining the characters of said font whose images are to be projected to the sensitized surface, comprising dual groups of movable selector elements each group having elements correlated with the several different printing characters of said font, each group having associated therewith means operable to selectively set in operative position the selector elements of said group which correspond to the printing characters whose images are to be projected to the sensitized surface, and means cooperating with said selected elements subsequently to said setting thereof for effecting operation of said image-projecting means of the printing characters corresponding with said selected elements, the means for selectively setting the elements of one group being operable during the period that said means are cooperating with the selected elements of the second group to effect operation of the image-projecting means.

18. A relay character-selecting means in an apparatus for photographically composing printing characters according to claim 5, including in coordination with said selecting means, means which acts after each image is projected to the sensitized surface to advance said sensitized surface to position to receive the image next projected.

19. In a relay apparatus for selecting printing characters from a font of different characters, the combination of a group of movable selector elements arranged in like order in parallel longitudinal rows, each of which rows includes elements corresponding to a different one of said several different printing characters, a series of setting devices for said elements, a carriage on which said setting devices are arranged each in register with one of said rows of elements, means for advancing said carriage in one direction lengthwise of said rows for placing said setting devices in register with successive elements of said rows, a key for each of said several printing characters operatively connected each with a different one of said setting devices for selectively setting corresponding ones of said elements in character-selecting position, and means on said carriage and cooperating with such selected elements for selecting the printing characters corresponding therewith upon a subsequent movement of said carriage.

20. In a relay apparatus for selecting printing characters from a font of different characters, the combination of a pin board, a row of selector pins individually movable endwise in holes in said board and correlated with said font of printing characters, means for selectively setting pins of said row in operative position for character selection, an electric conductor frictionally contacting the sides of the several pins of said row, and a contact member movable along said row into contact with said selected pins subsequently to said setting thereof to establish a character selecting electric circuit from said conductor through said selected pins.

21. A relay apparatus for selecting printing characters from a font of different characters, comprising dual groups of movable selector elements, each group having elements correlated with the several different printing characters of said font, each group having associated therewith means operable to selectively set in operative position elements of said group for selecting the corresponding printing characters of said font, and means cooperating with said selected elements subsequently to said setting thereof for effecting selection of the corresponding printing characters, the means for selectively setting the elements of one group being operable during the period that said means are cooperating with the selected elements of the second group to effect the selection of the printing characters.

22. In a relay apparatus for selecting printing characters from a font of different characters, the combination of a group of movable selector elements arranged in like order in longitudinal rows, each of which rows includes elements corresponding to a different one of the several different printing characters, a series of setting devices for said elements, a carriage on which said setting devices are arranged in a transverse row with each device in register with a different longitudinal row of elements, means for advancing said carriage in one direction lengthwise of said rows for placing said setting devices in operative register with successive elements of said rows, an operating key for each of said several printing characters connected each with a different one of said setting devices for selectively setting corresponding ones of said elements in operative position, and a series of contact devices on said carriage arranged to contact with said selected elements upon a return travel of said carriage to establish electric circuits for selecting the printing characters corresponding with said selected elements, said setting devices being mounted on said carriage at one side of said board, and said contact devices being mounted on said carriage at the opposite side of said board.

23. A relay character-selecting means in an apparatus for photographically composing printing characters according to claim 5, in which the photographic exposure period for the character images is controlled by regulating the speed of return movement of said means which effects operation of said image projecting means.

WILLIAM C. HUEBNER.